United States Patent [19]
Füller et al.

[11] Patent Number: 5,783,231
[45] Date of Patent: Jul. 21, 1998

[54] MOLD CLOSING DEVICE WITHOUT CROSS-BEAM

[75] Inventors: Klaus Füller, Schwerin; Christian Hopp, Consrade, both of Germany

[73] Assignee: Hemscheidt Maschinentechnik Schwerin GmbH & Co., Schwerin, Germany

[21] Appl. No.: 575,219

[22] Filed: Dec. 20, 1995

[30] Foreign Application Priority Data

Jan. 19, 1995 [DE] Germany ............... 195 01 469.3

[51] Int. Cl.[6] ................ B29C 45/64; B29C 33/20; B29C 49/56
[52] U.S. Cl. ............... 425/451.9; 100/231; 100/258 A; 425/541; 425/595
[58] Field of Search ................ 425/541, 589, 425/595, 450.1, 451.9; 100/258 A, 231

[56] References Cited

U.S. PATENT DOCUMENTS

| | | | |
|---|---|---|---|
| 5,249,951 | 10/1993 | Leonhartsberger et al. | 425/589 |
| 5,633,024 | 5/1997 | Ziv-aV | 425/595 |
| 5,650,182 | 7/1997 | Fuller et al. | 425/595 |

FOREIGN PATENT DOCUMENTS

| | | |
|---|---|---|
| 20 48 258 C2 | 2/1976 | Germany. |
| 0 311 133 A1 | 10/1988 | Germany. |
| G 92 12 480.1 | 1/1993 | Germany. |

*Primary Examiner*—James P. Mackey
*Attorney, Agent, or Firm*—Darby & Darby

[57] ABSTRACT

A mold closing device without cross-beam for a molding machine, e.g. injection molding or blow molding is disclosed. The mold closing device has a U-shaped machine frame with two arms defining a horizontal injection plane and a movable positioning device located within the first arm and moving along the injection plane; a moveable adapter plate including a vertical mold mounting surface, located on the positioning device; a fixed adapter plate with a vertical mold mounting surface on the second arm and on the injection plane; a first mold die-half is attached to the essentially vertical moveable adapter plate; a second mold die-half is attached to the essentially fixed adapter plate; and one of the arms includes a weakened cross-section for providing a controlled deformation of the machine frame resulting from the occurring closing and holding forces during operation of the molding machine and for maintaining the mold mounting surfaces vertical.

19 Claims, 6 Drawing Sheets

MOLD CLOSING DEVICE WITHOUT CROSS-BEAM

BACKGROUND OF THE INVENTION

1. Field of the Invention

The invention relates to a mold closing device without cross-beam, particularly for processing machines in the plastics industry, e.g. injection molding machines, comprising a U-shaped machine frame, each of the two arms of said frame provided with an adapter plate, such that one plate is fixed and the other plate is longitudinally movable by means of a positioning device. The fixed adapter plate and the movable adapter plate are provided with mounting surfaces for receiving mold halves of a molding die. The closing and separation force which is created by the linear drive during the injection and separation process, is absorbed by the machine frame.

2. Description of the Related Art

EP 0311133 A1 and DE-GM 9212480 describe generic solutions which have the advantage that, as a result of the U-shaped machine frame, the space inside the machine between the fixed and the movable adapter plate is not obstructed. As a result, the tooling change is significantly simpler than in mold closing devices where the closing force is transmitted by cross-bars connecting the two adapter plates. In addition, larger molding dies requiring a smaller closing force can be used in injection molding machines, as a result of the better utilization of the mounting surface of the adapter plates, which leads to a more economical cost structure. In order to achieve a perfect parallelism of the two mold halves in spite of the deformation of the machine frame due to the very large die forces, is was already suggested in EP 0311133 A1 that one of the two adapter plates is supported in such way that it is tiltable around a horizontal axis. It was further suggested in DE-GM 9212480 that the fixed die plate is supported in the machine frame in such way that it is tiltable around a horizontal axis, and that the movable die plate is rotatable around a horizontal axis distant from the plate. In order to prevent the movable die plate from lifting off from the machine frame, the movable die plate is provided with a crosshead shoe which is adapted for a close fit with a guide bar. The guide bar is supported on one side either by the fixed adapter plate or by the machine frame. In order to assure relative movement between the movable adapter plate and the guide bar, springs are provided either between the crosshead shoe and the movable adapter plate, or the guide bar is secured with springs to the machine frame. Furthermore, in DE 2048258 is described a generic mold closing device for the manufacture of plastic containers by the blowing mold method, wherein both adapter plates can be moved towards each other and away from each other. Herein, both adapter plates are supported by the arms of the U-shaped machine frame such that they can pivot around one axis, and are guided by appropriate guide means. All solutions known in the art have the disadvantage, that very large and expensive bearings are required for supporting the fixed adapter plate and/or the movable adapter plate(s), or the fixed adapter plate(s) and the end plate in the machine frame using single-axle support means. Furthermore, the parallelism of the adapter plates with respect to one another can only be assured by way of appropriate guide means. The single-axle support of the end plate and the fixed and movable adapter plates, respectively, results in tilt loads which in turn cause severe wear of the guides for the molding dies and of the guides for the movable adapter plates.

It is therefore an object of the invention to find a more economical solution, such that the parallelism of the mold halves is retained when the machine frame is deformed by the large die forces.

SUMMARY OF THE INVENTION

According to the invention, the problem is solved, in that a section along the cross-section of at least one arm of the machine frame is weakened, such that a controlled elastic deformation of the arms is created by the existing closing and holding forces in such a way that the mounting surfaces for the mold halves of the molding die do not subjected to any angular deviation from their preferably vertical operating position. According to the invention, both the arm for the fixed adapter plate and the arm for the end plate can be provided with a weakened cross-section. It is also workable, that only the arm for the fixed adapter plate or only the arm for the end plate are provided with a weakened cross-section. The arm or arms may also comprise elastically deformable brackets having a cross-section which is weakened in the middle by having material removed by milling or other means and wherein the brackets are part of the end plate or the fixed adapter plate. Mold closing devices without cross-beam which are used for producing hollow pieces on blowing mold machines, are, in contrast to injection molding machines, provided with two movable adapter plates which are movable towards each other or away from each other. Here, preferably both arms of the machine frame or only one of the arms, to which the two movable adapter plates are attached, may be provided with a weakened cross-section.

In another embodiment of the invention, it is provided for that the weakened cross-section in the arms of the machine frame is preferably formed by slots and that the fixed adapter plate and the end plate, or both movable adapter plates, are attached to the inside of preferably essentially vertical mounting surfaces on the arms of the machine frame. The slots are shaped and arranged in a manner, that their deformation during the application of the closing force and the simultaneously occurring deformation of the machine frame has no or only an insignificant effect on the preferably essentially vertical orientation of the attachment face.

In addition, the slots in the arms have preferably an essentially horizontal orientation, are positioned below the injection plane, are terminated by at least one semi-circle, and are provided with an opening facing the molding die. The slots in the arms, however, may also be positioned above or below the injection plane and may be terminated by two semi-circles.

This solution has the advantage that no bearing arrangements which are difficult to design and expensive to implement, are required for attaching the fixed adapter plate and the cylindrical plate or the movable adapter plates to the machine frame. The fixed adapter plate or the end plate or the movable adapter plates can be quickly attached to or removed from the machine frame by means of a simple detachable screw connection. The position and the shape of the slot in the arms of the U-shaped machine frame can be varied depending on the technical and technological requirements, for instance for injection molding operations (injector access and access to the hydraulic lines of the linear drive). The significant advantage of the invention, however, is that, as a result of the arrangement of the slots, a portion of each arm is able to undergo a bending deformation when the closing and separation force is applied, such that the tilt angle of the attachment face of the fixed adapter plate or of the end plate does not change at all or changes only insignificantly.

In another embodiment of the invention, it is provided that if only one arm of the machine frame possesses a weakened cross-section, then the adapter plate or end plate located at the corresponding other arm is attached to the machine frame by means of elastically deformable members at at least two horizontal bearing arbors which are oriented perpendicular to the longitudinal center line. The bearing arbors are located above and below the injection plane. The elastically deformable members are arranged and attached in such a way that the existing closing force or holding force provides a controlled elastic deformation of the elastically deformable members, such that the mounting surfaces of the adapter plates do not experience any angular deviation. According to this embodiment of the invention, various combinations are possible. First, the arm to which the end plate is attached, may be provided with a slot, and the fixed adapter plate may be received in the machine frame by two horizontal bearing arbors which are located above and below the injection plane and are oriented perpendicular to the longitudinal center line of the mold closing device. Here, at least two elastically deformable members are located between the mounting surface of the fixed adapter plate and the bearing arbor which is located below the injection plane. In the alternate combination, the arm to which the fixed adapter plate is attached, is provided with a slot and the end plate is received in the machine frame by two horizontal bearing arbors. The bearing arbors are also located above and below the injection plane and are oriented perpendicular to the longitudinal center line of the mold closing device. At least two elastically deformable members are located between the mounting surface of the movable adapter plate and the bearing arbor of the end plane which is located below the injection plane. The bearing arbors may also be used to mount both the fixed adapter plate and the movable adapter plate.

The mold closing device without cross-beam may also include an end plate secured in the first arm of the machine frame by at least two horizontal bearing arbors such that one of the at least two bearing arbors is located above the injection plane and another of these bearing arbors is located below the injection plane. Both arbors are oriented perpendicular to the longitudinal center line of the mold closing device, such that at least two elastically deformable members are located between the mounting surface of the movable adapter plate and the bearing arbor of the end plate located below the injection plane. The elastically deformable members may include brackets and the section of the bracket may bee weakened in the middle by removal of material, and the brackets may be an integral part of the end plate or the fixed adapter plate. On each arm, there may be a substantially vertical attachment face and an end plate, the end plate is attached to the vertical attachment face of the first arm and the fixed adapter plate is attached to the second arm. The attachment faces for the fixed adapter plate and the end plate are oriented horizontally, if the mold closing device is oriented vertically. The attachment faces may also be inclined.

In each combination, the elastically deformable members are arranged in such a way that, when the closing and separation force is generated, the elastic deformation of the machine frame leads simultaneously to an elastic compression of the deformable members, such that the vertical orientation of the attachment face of the fixed adapter plate and the vertical orientation of the attachment face of the movable adapter plate are both maintained. The combination described last, which attains parallelism between the mold halves of the molding die either by a controlled elastic deformation of the arms of the machine frame or by the use of elastic members between the machine frame and the fixed adapter plate or end plate, creates a number of advantages. For instance, the support by elastically deformable members provides improved access to the injector area behind the fixed adapter plate and improved access to the threaded hydraulic connections on the locking cylinder near the end plate. Another advantage is that the elastically deformable members can, for instance, be formed as round bars which are simple to manufacture. Thereby deviations from parallelism between the adapter plates caused by manufacturing tolerances can be corrected without much effort and expenditure by simply adjusting the length or diameter of the round bars.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PREFERRED EMBODIMENTS

Figure 1:
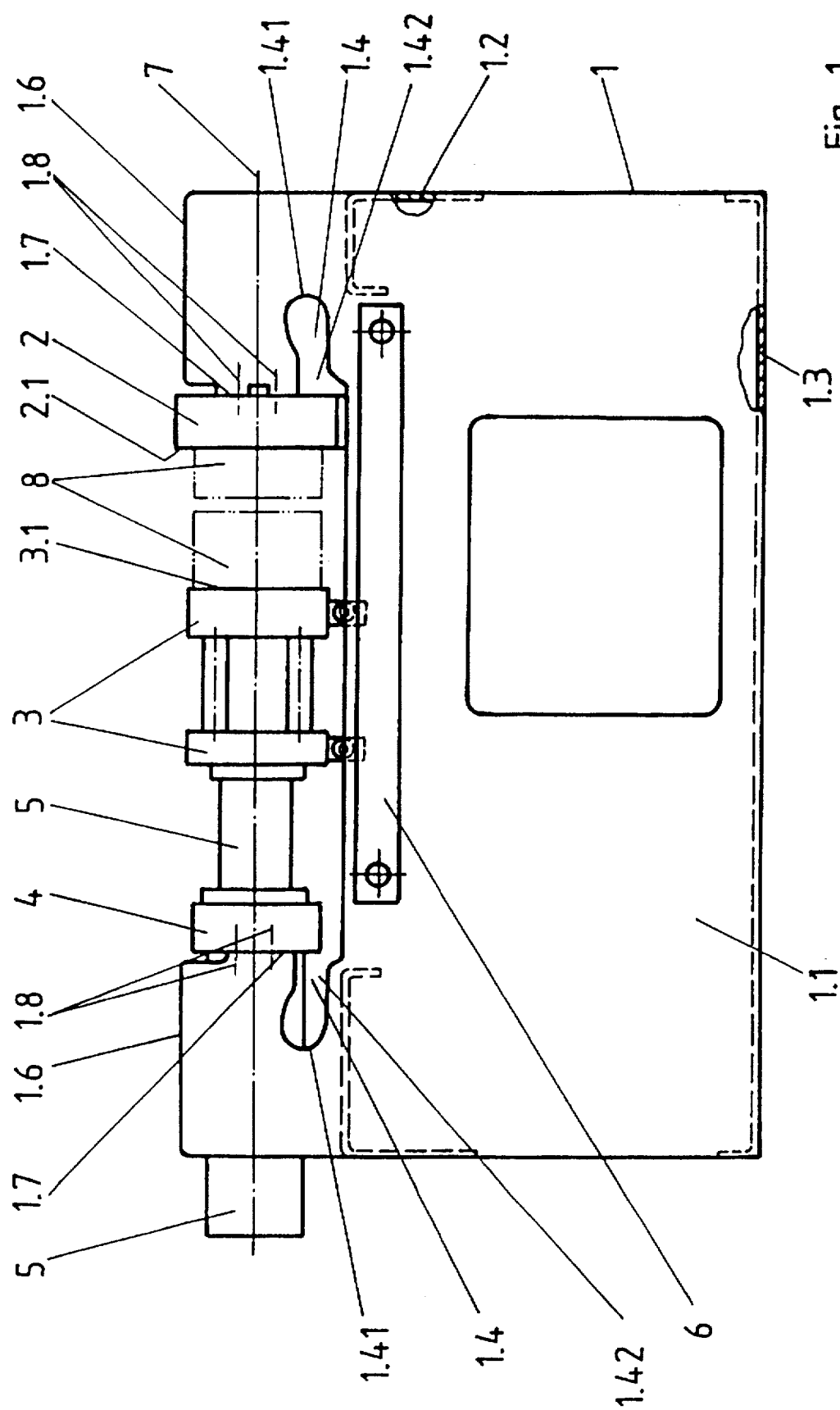
FIG. 1 a front view of a mold closing device without cross-beam in an open position.

FIG. 1 shows a mold closing device without cross-beam for an injection molding machine for processing plastics without injector. The mold closing device comprises a U-shaped machine frame 1, which is provided with a fixed adapter plate 2 attached to the inside of one arm 1.6, and with an end plate 4 attached to the inside of the other arm 1.6. In the embodiment, the U-shaped machine frame 1 is formed by two side walls 1.1 which are connected through a spacer 1.2 and a base 1.3. The movable adapter plate 3 which is movable on guide bars 6 supported via rollers 6.1 on the guide bars 6 and by means of a positioning device, is located between the fixed adapter plate 2 and the end plate 4. The positioning device is formed as a linear drive 5 having a longitudinal axis 15, which in the embodiment comprises an active hydraulic cylinder which is supported by the end plate 4 and the fixed adapter plate 3. The electro-hydraulic control (not shown) generates, by way of the active hydraulic cylinder, the required closing and separation force for closing and opening of the mold halves of the molding die 8. The closing and separation forces are thereby absorbed only by the U-shaped machine frame. For receiving the corresponding mold half of the molding die 8, the fixed and the movable adapter plate are each provided with corresponding mounting surfaces 2.1 and 3.1.

Figure 2:
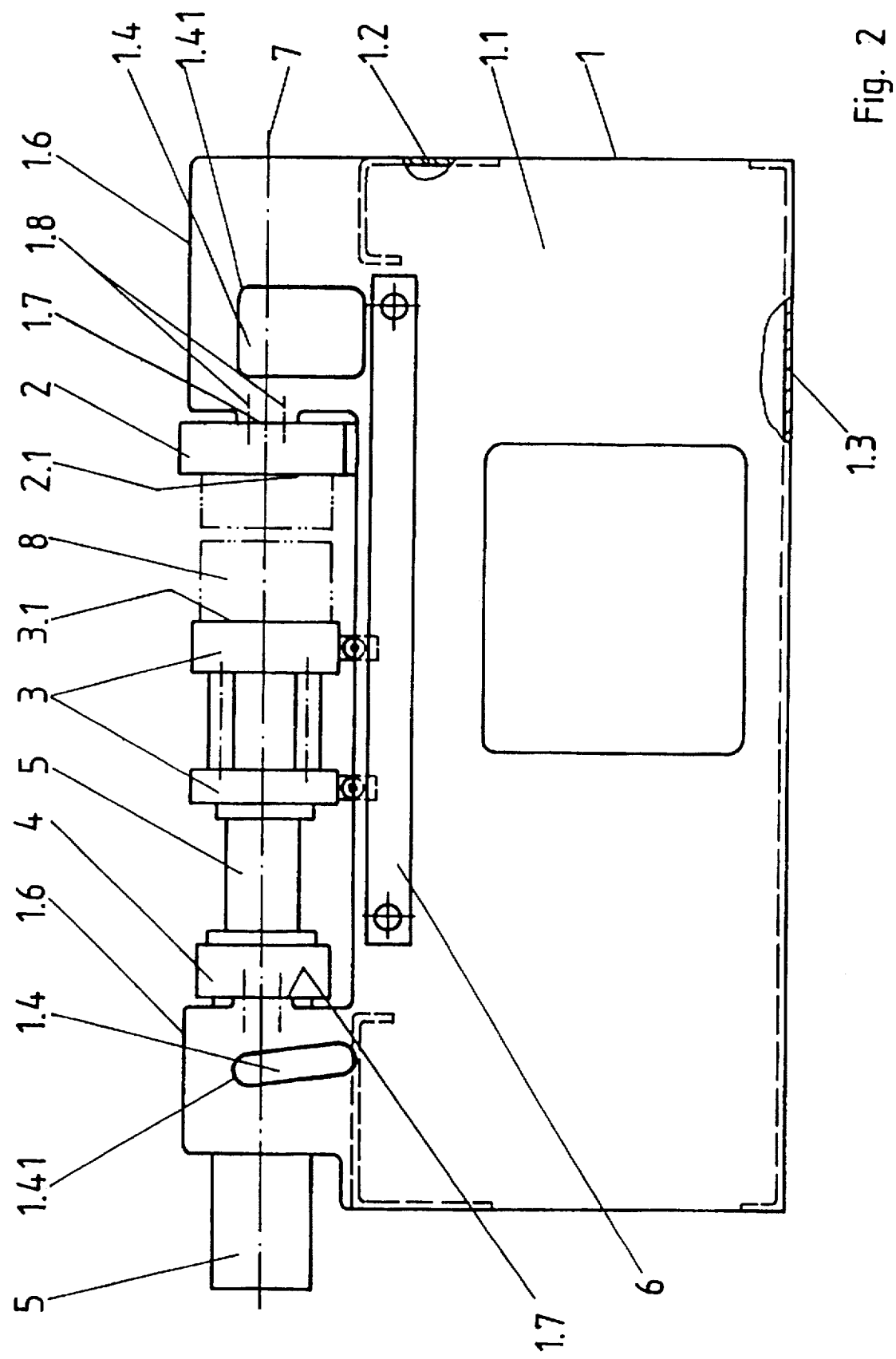
FIG. 2 a different embodiment of a mold closing device without cross-beam.

FIG. 1 shows the slots 1.4 provided on the inside of both arms 1.6 of the machine frame 1. The slots 1.4 are preferably located below the injection plane 7, are open to one end and are terminated on the other end by a semi-circle 1.41. In the embodiment, the slots 1.4 are oriented approximately horizontally and have on the inside an opening 1.42 facing in the direction of the adapter plates 2 and 3. FIG. 2 shows other closed shapes of the slots 1.4 which are oriented vertically or horizontally, have different widths, and are significantly rounded at the ends or are terminated by a semi-circle 1.41. As is shown in FIG. 1 and FIG. 2, the fixed adapter plate 2 and the end plate 4 are attached to vertical attachment faces 1.7 at the inside of the arms 1.6 of the machine frame 1. Attachment is attained by way of detachable screw connections 1.8 which are indicated in FIG. 1 and in FIG. 2 by their center lines only, thereby enabling quick installation and removal. The position and size of the slot 1.4 in the arms 1.6 of the machine frame 1 can be freely selected and arranged with the limitations discussed below. It will have to be averred through proper design that the angle of the attachment faces 1.7 of the fixed adapter plate 2 and the end plate 4 in relation to the linear drive 5 does not change.

Figure 3:
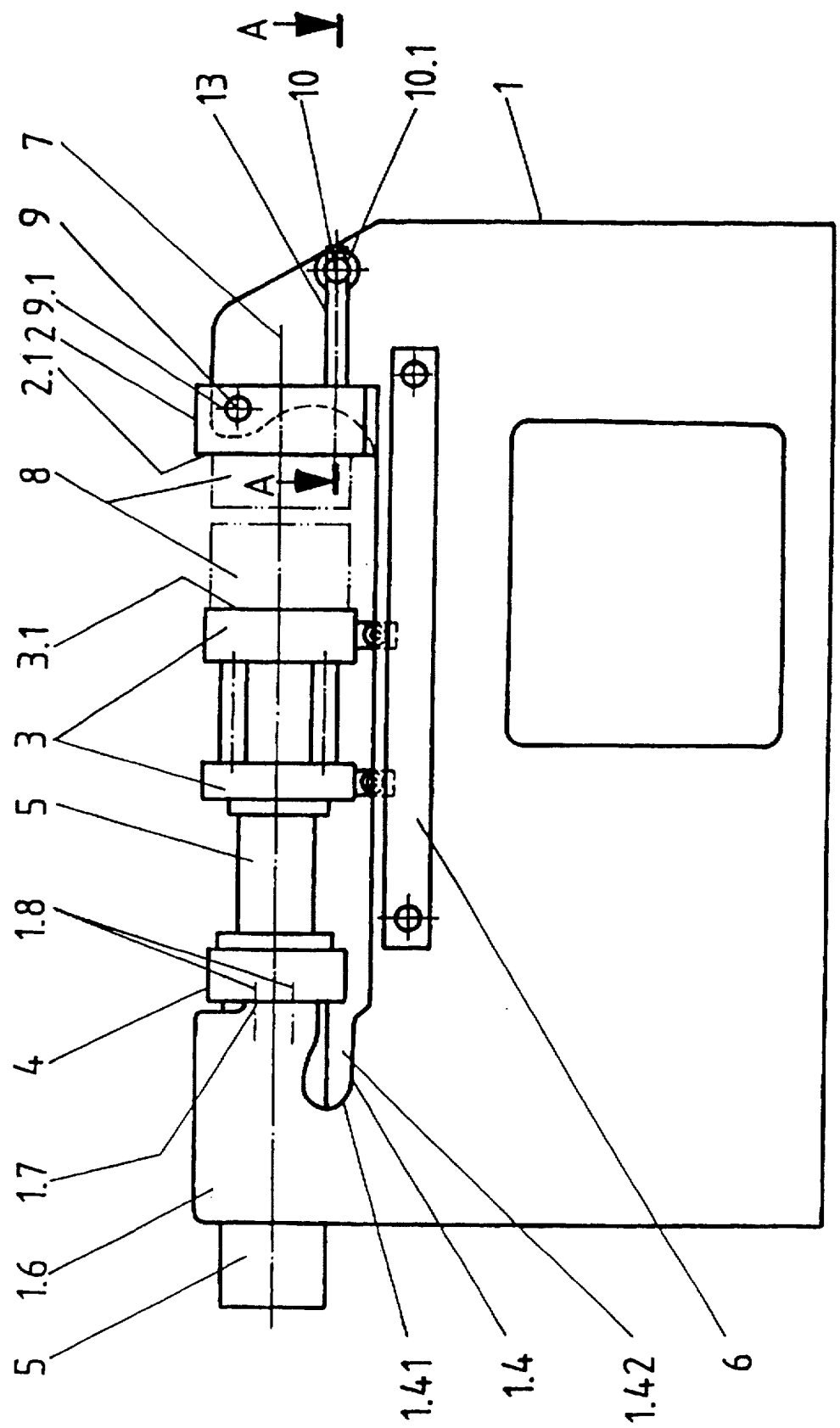
FIG. 3 a front view of a different embodiment of a mold closing device without cross-beam.

FIG. 3 shows another embodiment of a mold closing device without cross-beam wherein a slot 1.4 is provided in only one arm 1.6 on one side of the U-shaped machine frame 1. The slot 1.4 is located on that side where the end plate 4 is attached; the slot is open in the direction facing the end plate 4, is oriented approximately horizontally and is terminated in a large semi-circle 1.41. The end plate is also attached at the inside to the attachment face 1.7 of arm 1.6 by way of a screw connection 1.8. The fixed adapter plate 2, on the other hand, is supported in the machine frame 1 by two horizontal bearing arbors 9 and 10. This support structure has already been described in more detail in the prior application P 4420639.9. One bearing arbor is located above the injection plane 7, the other bearing arbor is located below the injection plane 7. The bearing arbors 9 and 10 are located parallel to the mounting surface 2.1 of the mold closing device and have preferably different distances to the mounting surface 2.1 of the fixed adapter plate 2. Hereby, the lower distance to the mounting surface 2.1 is larger than the upper distance.

Figure 4:
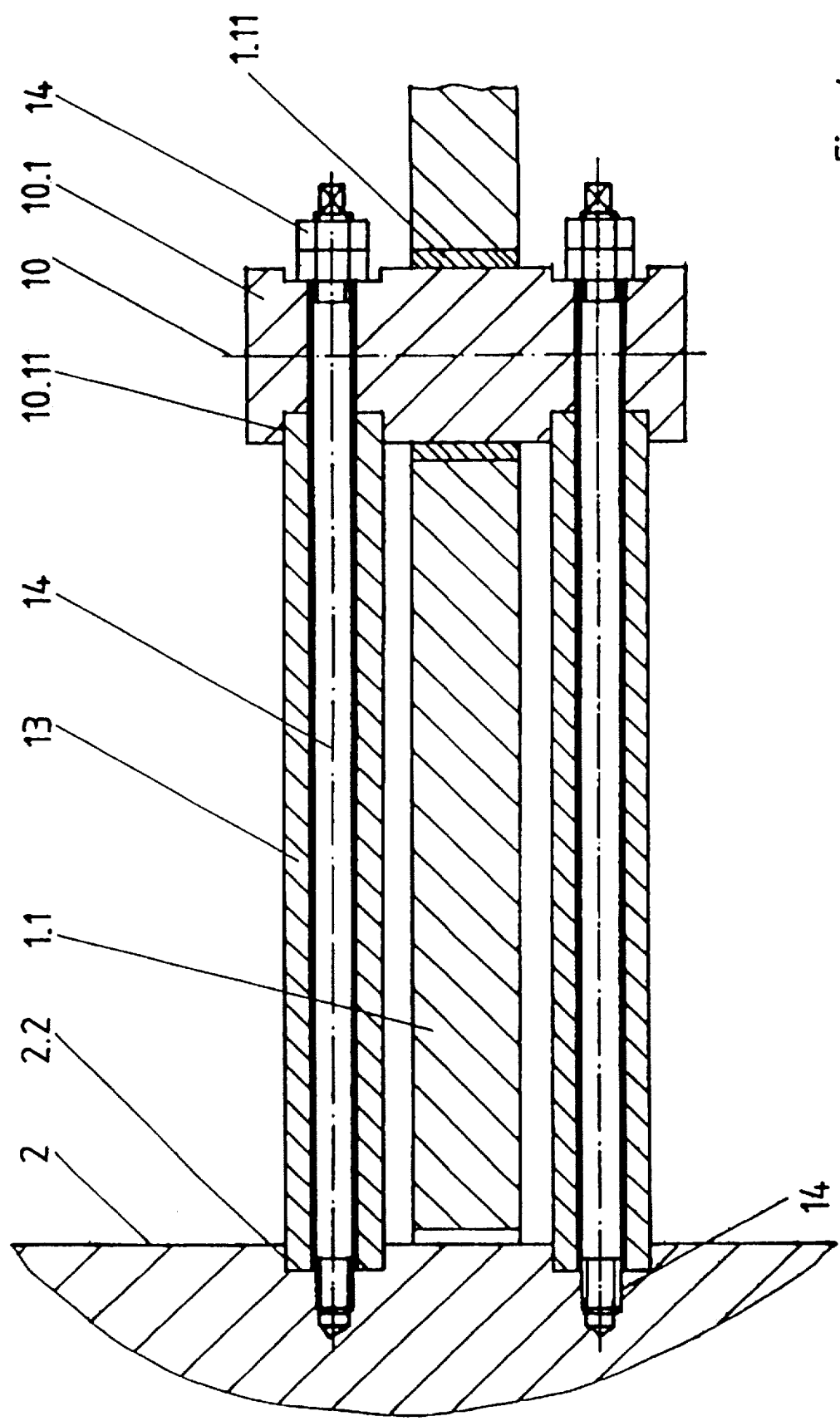
FIG. 4 a cross-sectional view along the line A—A in FIG. 3.
Figure 6:
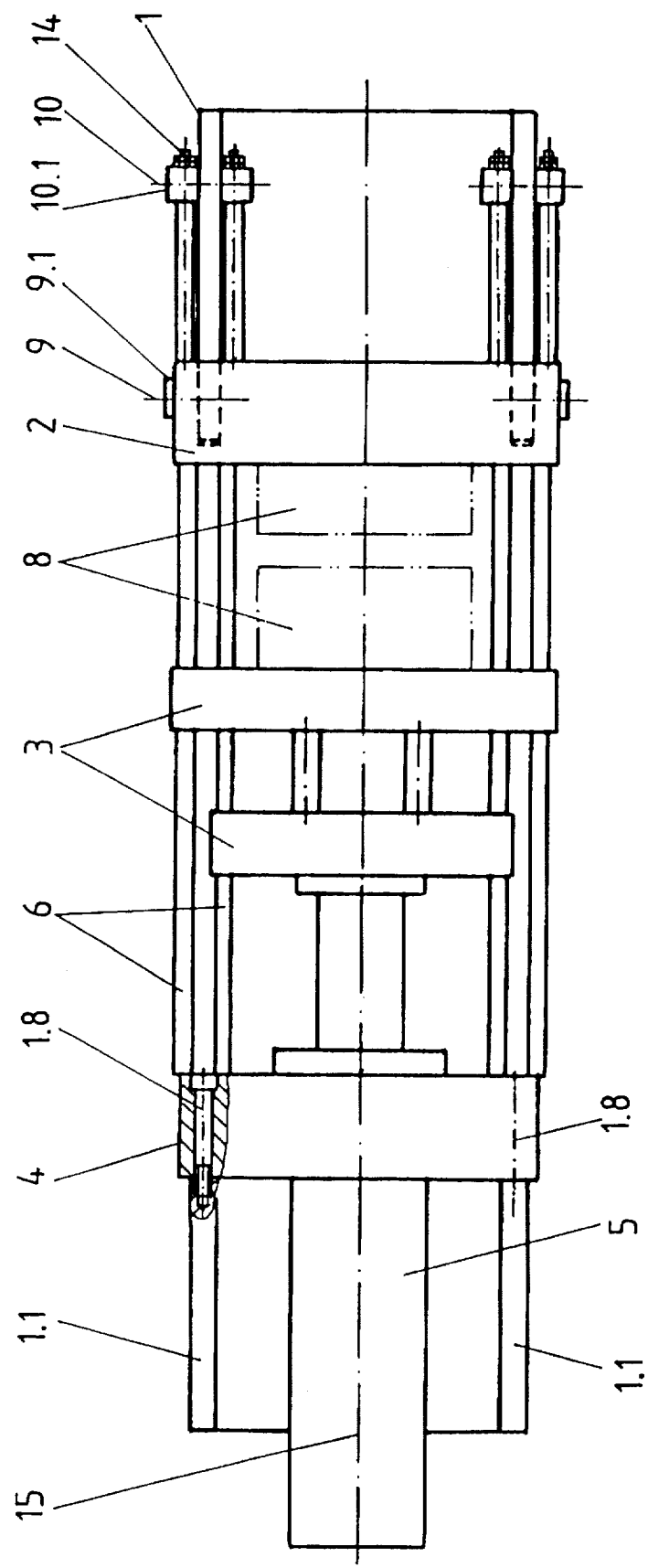
FIG. 6 an enlarged top view of a mold closing device without cross-beam in accordance with FIG. 3.

FIG. 4 shows in an enlarged cross-sectional view a portion of the lower bearing surface with the bearing arbor 10 for the fixed adapter plate 2 along the line A—A in FIG. 3. The bearing arbor comprises a bolt 10.1 which is received by a bearing bushing 1.11 located in the side wall 1.1 of the machine frame 1. Pressure rods 13 which are formed in the shape of hollow cylinders, are located on both sides of each side wall 1.1. The pressure rods 13 are centered in and supported by recesses 2.2 in the fixed adapter plate 2 and in recesses 10.11 in bolt 10.1. The hollow cylindrical pressure rods 13 are removably attached between the fixed adapter plate 2 and the bolt 10.1 by a screw connection 14. The upper bearing arbor 9 for the fixed adapter plate 2 shown in FIG. 3 comprises a bolt 9.1 which is received by a bearing bushing (details are not indicated) in the side wall 1.1 of the machine frame 1. The pressure rods 13, however, may also be secured and attached in other ways. The pressure rods 13 may, for instance, be provided on one end with a bearing lug which is attachable to a bearing bolt, whereas the other end may be bolted to a fixed adapter plate 1. The dual-arbor support of the fixed adapter plate in the machine frame 1 has the advantage that access to the injection molding nozzle (not shown) is facilitated. On the other hand, the simple removable attachment of the end plate 4 to the inside of the arm 1.6 of the machine frame 1 and the retention of parallelism between mold halves 8 by way of the controlled deformation of the arm 1.6 results in very favorable production cost. Also possible is the reverse combination which is not shown here. Here, the end plate is supported in the machine frame 1 by dual arbors. The desired parallelism between the mold halves 8 is achieved first by way of the deformable pressure rods 13 and then by way of the controlled deformation of the arms 1.6 of the machine frame 1 to which the fixed adapter plate 2 is attached. In order to provide a clearer understanding of the drawings, an enlarged top view of a mold closing device without cross-beam in accordance with FIG. 3 is presented in FIG. 6. Visible in the right section of the figure are the bearing arbors 9 and 10 together with the bearing bolts 9.1 and 10.1 for receiving the fixed adapter plate 2 in the machine frame 1, as well as the pressure rods 13 which are located on the side of the machine frame 1. Shown in the left section of the figure is the attachment of the end plate 4 to the machine frame 1 by way of a screw connection 1.8.

Figure 5:
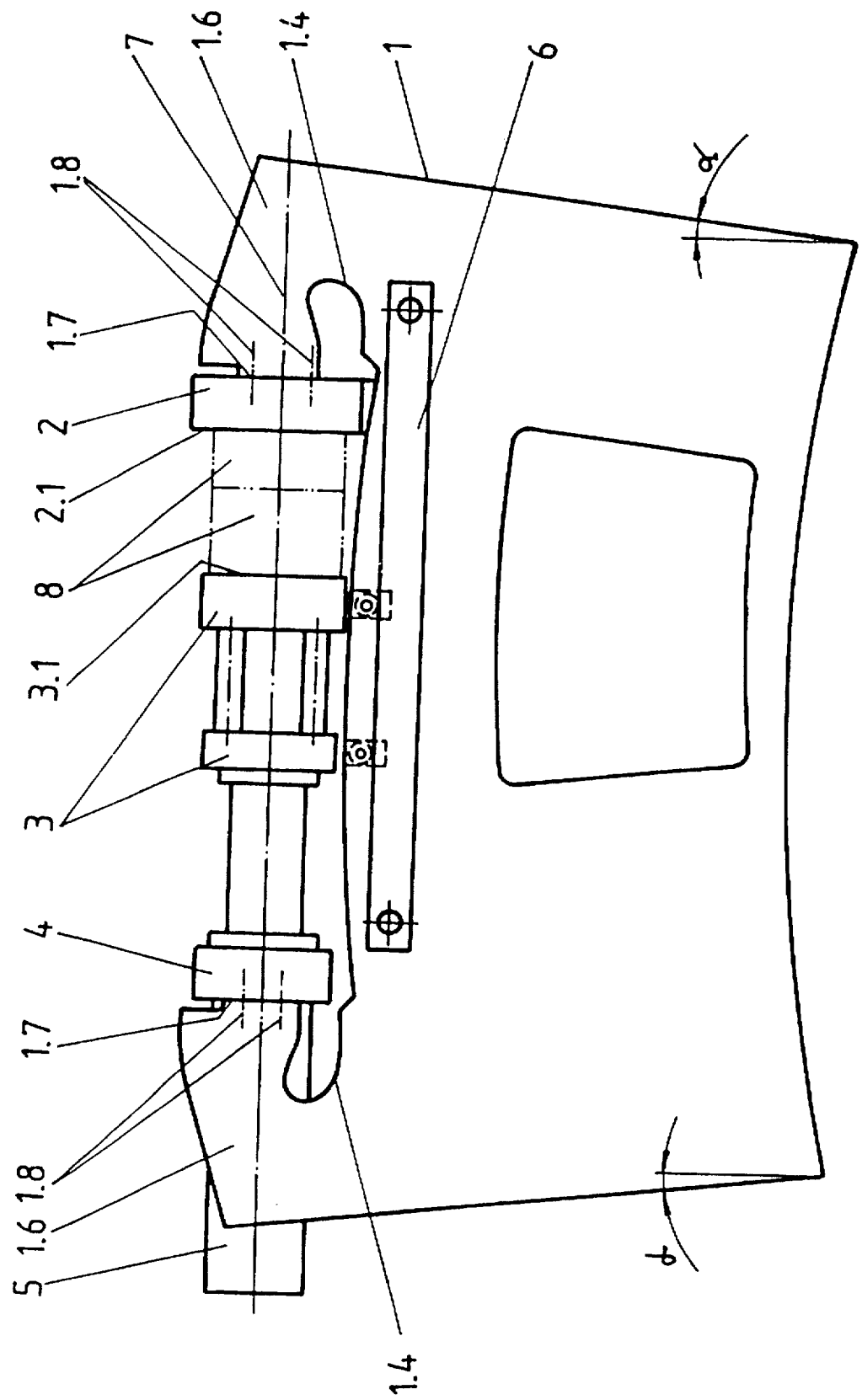
FIG. 5 a mold closing device without cross-beam in accordance with FIG. 1 in the closed position.

FIG. 5 shows a mold closing device in accordance with FIG. 1, herein, however, in closed position in a deformed state. In the illustrated closed position, the machine frame 1 is deformed during the application of the closing force by the linear drive 5 by an angle $\alpha$; this angle is rather exaggerated in this figure. The resulting expansion of the arms usually amounts to several millimeters. In a machine frame 1 not constructed according to the invention, the fixed adapter plate 2 and the end plate 4 would be tilted by the same angle $\alpha$ by which the machine frame 1 is deformed. As a result, the molding die would open, material would inadvertently escape and/or internal tool guiding mechanisms could be destroyed. Because of the defined and opposing elastic deformability of the arms 1.6 in the region above the slot 1.4 of the U-shaped machine frame 1, however, the tilt of the machine frame 1 is not transmitted to the region of the attachment faces 1.7 for the end plate 4 and for the fixed adapter plate 2. The slot 1.4 changes its shape for the duration of the elastic deformation.

The mold closing device without cross-beam according to the invention can be utilized in a similar manner in pressure and die casting machines in the metalworking industry.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A mold closing device without cross-beam for a molding machine, comprising:

a U-shaped machine frame;

two arms, a first and a second arm, disposed on the frame and defining a horizontal injection plane connecting the first and second arm;

a movable positioning device having a longitudinal axis, the positioning device being disposed within the first arm and moving along the injection plane;

a moveable adapter plate including a substantially vertical mold mounting surface, disposed on the positioning device;

a fixed adapter plate including a substantially vertical mold mounting surface disposed on the second arm and on the injection plane;

a first mold die-half attached to the substantially vertical mold mounting surface of the moveable adapter plate;

a second mold die-half attached to the substantially vertical mold mounting surface of the fixed adapter plate; and at least one of the two arms includes a weakened section for providing a controlled deformation of the machine frame resulting from occurring closing and holding forces during operation of the molding machine and for maintaining the mold mounting surfaces substantially vertical.

2. A mold closing device without cross-beam for a molding machine, comprising;

a U-shaped machine frame:

a first and a second arm disposed on the frame and defining a horizontal injection plane connecting the two arms by a longitudinal center line;

a movable positioning device having a longitudinal axis, the positioning device being disposed within the first arm and moving along the injection plane;

a moveable adapter plate including a substantially vertical mold mounting surface disposed in the positioning device;

a fixed adapter plate including a substantially vertical mold mounting surface disposed on the second arm and on the injection plane;

a first mold die-half attached to the substantially vertical mold mounting surface of the moveable adapter plate;

a second mold die-half attached to the substantially vertical mold mounting surface of the fixed adapter plate;

the first arm includes a weakened section for providing a controlled deformation of the machine frame resulting from occurring closing and holding forces during operation of the molding machine and for maintaining the mold mounting surfaces substantially vertical;

at least two bearing arbors including elastically deformable members, the at least two bearing arbors being oriented horizontally and perpendicular to the longitudinal center line; and wherein the fixed adapter plate is secured to the machine frame by the at least two bearing arbors, for providing a controlled elastic deformation of the members resulting from the occurring closing and holding forces during operation of the molding machine and for maintaining the second die-half essentially vertical.

3. The mold closing device without cross-beam according to claim 1, further comprising an essentially vertical attachment face on each arm;

and an end plate;

the end plate being attached to the vertical attachment face of the first arm and the fixed adapter plate being attached to the second arm.

4. The mold closing device without cross-beam according to claim 1, wherein the weakened section in the at least one of the arms comprises a slot.

5. The mold closing device without cross-beam according to claim 3, wherein the weakened section in the at least one of the arms comprises a slot, for controlling the deformation such that the occurring closing and holding forces during operation of the molding machine does not effect the substantially vertical orientation of the attachment face on each arm.

6. The mold closing device without cross-beam according to claim 5, wherein the slot is positioned horizontally and below the injection plane, and terminate in a semi-circle and having an opening facing toward the movable mold die-half.

7. The mold closing device without cross-beam according to claim 5, wherein the slot extends above and below the injection plane and terminates in a semi-circle.

8. The mold closing device without cross-beam according to claim 2, wherein the at least two bearing arbors comprise at least two horizontal bearing arbors of which one bearing arbor is located above the injection plane and another bearing arbor is located below the injection plane; and both arbors are oriented perpendicular to the longitudinal center line, and at least two elastically deformable members are located between the mounting surface of the fixed adapter plate and the bearing arbor located below the injection plane.

9. A mold closing device without cross-beam according to claim 2, further comprising an end plate secured to the first arm of the machine frame by at least two horizontal bearing arbors, such that one of the at least two bearing arbors is located above the injection plane and another of the at least two bearing arbors is located below the injection plane and both of the at least two arbors are oriented perpendicular to the longitudinal center line of the mold closing device, and such that at least two elastically deformable members are located between the mounting surface of the movable adapter plate and the bearing arbor of the end plate located below the injection plane.

10. A mold closing device without cross-beam for a molding machine, comprising:

a U-shaped machine frame including side walls;

a first and a second arm disposed on the frame and defining a horizontal injection plane connecting the first and second arm by a longitudinal center line;

a movable positioning device having a longitudinal axis, the positioning device being disposed within the first arm and moving along the injection plane;

a first and a second movable adapter plate, the first adapter plate includes a substantially vertical mold mounting surface, disposed on the positioning device;

an end plate disposed on the positioning device;

a fixed adapter plate including a substantially vertical mold mounting surface disposed on the second arm and on the injection plane;

a first mold die-half attached to the substantially vertical mold mounting surface of the moveable adapter plate disposed across from the fixed adapter plate;

a second mold die-half attached to the substantially vertical mold mounting surface of the fixed adapter plate; and the first and the second arm including a weakened section for providing a controlled deformation of the machine frame resulting from occurring closing and holding forces during operation of the molding machine and for maintaining the mold mounting surfaces substantially vertical.

11. A mold closing device without cross-beam for a molding machine, comprising:

a U-shaped machine frame including side walls;

a first and a second arm disposed on the frame and defining a horizontal injection plane connecting the two arms by a longitudinal center line;

a movable positioning device having a longitudinal axis, the positioning device being disposed on the first arm and moving along the injection plane;

a first and a second moveable adapter plate disposed on the positioning device the first adapter plate includes a substantially vertical mold mounting surface;

a fixed adapter plate including an substantially vertical mold mounting surface disposed on the second arm and on the injection plane;

a first mold die-half attached to the substantially vertical mold mounting surface of the moveable adapter plate disposed across from the fixed adapter plate;

a second mold die-half attached to the vertical mold mounting surface of the fixed adapter plate;

the first arm including a weakened section for providing a controlled deformation of the machine frame resulting from occurring closing and holding forces during operation of the molding machine and for maintaining the mold mounting surfaces substantially vertical;

at least two bearing arbors including elastically deformable members, the at least two bearing arbors being oriented horizontally and perpendicular to the longitudinal center line; and wherein the fixed adapter plate is secured to the machine frame by the at least two bearing arbors, for providing a controlled elastic deformation of the members resulting from the occurring closing and holding forces during operation of the molding machine and for maintaining the second mold die-half substantially vertical.

12. The mold closing device without cross-beam according to claim 10, further comprising guide bars positioned on the side walls of the machine frame, and at least one roller provided to support the movable adapter plates such that the at least one roller movingly presses against the guide bars.

13. The mold closing device without cross-beam according to claim 11, wherein the elastically deformable members comprise paired pressure rods.

14. The mold closing device without cross-beam according to claim 12, further comprising at least one elastically deformable member, wherein the at least one elastically deformable member is weakened by removal of material, and wherein the at least one elastically deformable member is an integral part of at least one of the end plate and the fixed adapter plate.

15. A molding machine comprising:

a machine frame having a first end and a second end;

a positioning device positioned near the first end of said machine frame, said positioning device movably supports a movable adapter plate including a first substantially vertical mold mounting face;

a fixed adapter plate fixedly attached near the second end of said machine frame including a second substantially vertical mold mounting face;

a first mold half attachable to the first substantially vertical mold mounting face and a second mold half attachable to the second substantially vertical mold mounting face; and a flexible weakened section positioned between the first end and the second end of the machine frame, said weakened section is adapted to provide a controlled deformation of the molding machine resulting from occurring closing and holding forces during operation of the molding machine and for maintaining the mold mounting surfaces substantially vertical.

16. The molding machine according to claim 15, wherein the flexible weakened section is positioned between the first end of the machine frame and the movable adapter plate.

17. The molding machine according to claim 15, wherein said flexible weakened section comprises a slot.

18. The molding machine according to claim 17, wherein said slot has an opening facing toward the mold halves.

19. The molding machine according to claim 15, further comprising an injecting plane defined between the center of the fixed adapter plate and the center of the movable adapter plate, the injecting plane is positioned above a longitudinal axis of the flexible weakened section.

* * * * *